No. 799,189. PATENTED SEPT. 12, 1905.
D. REYNOLDS.
PRODUCING WROUGHT IRON SPONGE.
APPLICATION FILED JAN. 3, 1905.
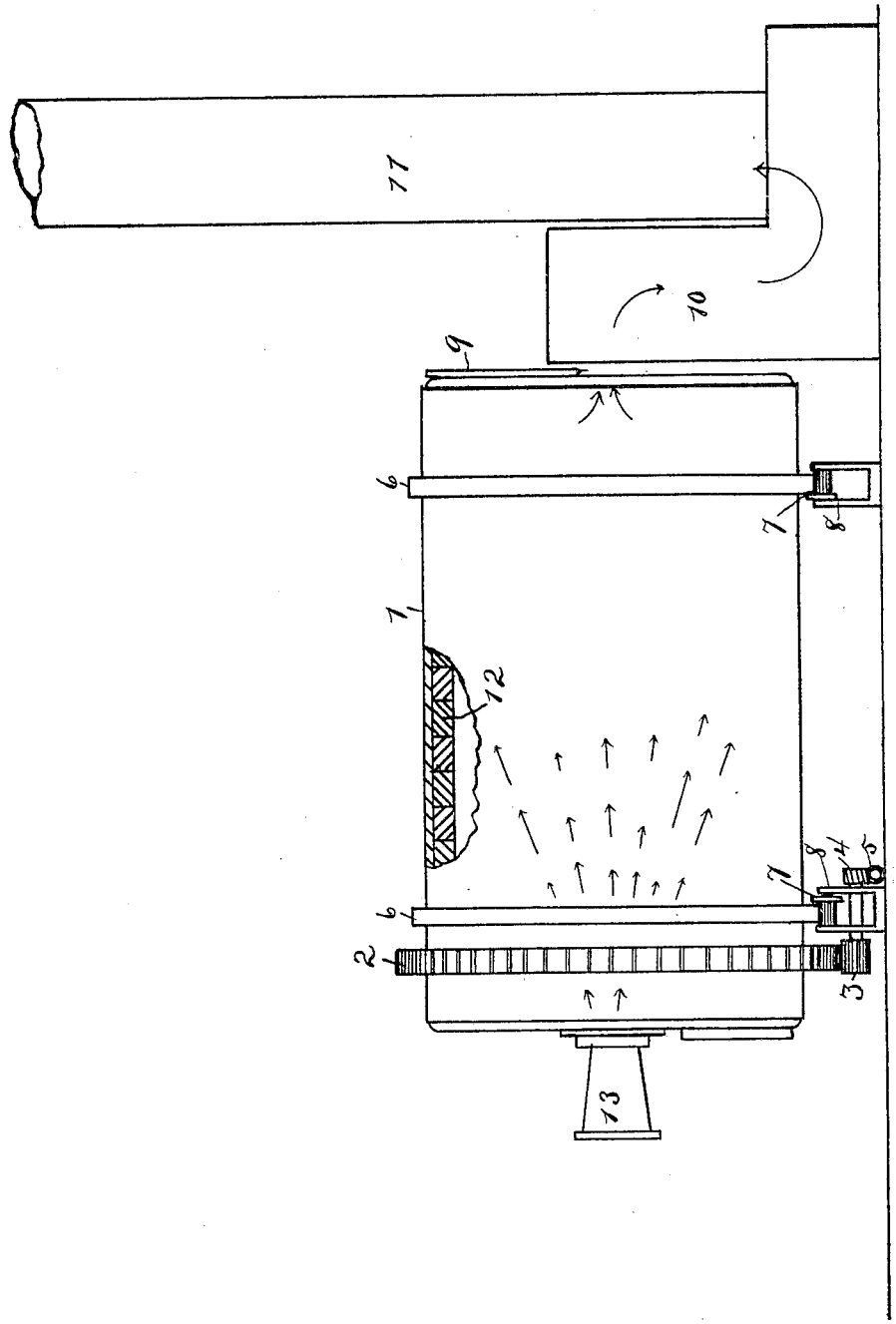
Witnesses
Mark Burns
Frank Lentz
Inventor:
Dexter Reynolds:
By W. M. Brown
his Atty:

UNITED STATES PATENT OFFICE.

DEXTER REYNOLDS, OF ALBANY, NEW YORK.

PRODUCING WROUGHT-IRON SPONGE.

No. 799,189. Specification of Letters Patent. Patented Sept. 12, 1905.

Application filed January 3, 1905. Serial No. 239,446.

*To all whom it may concern:*

Be it known that I, DEXTER REYNOLDS, a citizen of the United States, residing at Albany, New York, have invented certain new and useful Improvements in Producing Wrought-Iron Sponge; and I do hereby declare the following to be a full, clear, and exact description of the invention, such as will enable others skilled in the art to which it appertains to make and use the same, reference being had to the accompanying drawing, and to the figures of reference marked thereon, which forms a part of this specification.

My invention relates to a process of producing wrought-iron sponge direct from the oxid of iron.

In the drawing I show one form of furnace I have used in carrying out my process, which will be explained hereinafter. I use the granulated oxid-of-iron ore and granulated carbonaceous material and preferably thoroughly mix them before introducing them in the furnace; but on account of the rotary motion of my furnace it is not absolutely essential that they be first so mixed. I use for fuel preferably coal ground to a fine state and blow it into the furnace, where after an initial fire has been started of any combustible substance the coal-dust ignites and continues to produce flame as long as the dust is forced into the furnace. The coal-dust fire being once started, I continue it until the inner walls of the furnace are sufficiently heated and then stop the production of the flame. The mixture of oxid of iron and carbonaceous material is then charged into the furnace, and the furnace is properly closed, so that practically no atmospheric air can enter it, the chimney-exit through which the waste products find their way to the chimney being partially closed by the operative damper 9, so as to allow the escape of the products of combustion arising from the burning of the carbonaceous portion of the mixture in the furnace. The furnace being slowly revolved rolls the mixture and thoroughly intermixes it and brings each particle into contact with the highly-heated inner walls and the heated atmosphere of the furnace. Practically no air enters the furnace during this part of the process. The result secured is that the oxid of iron is brought particle by particle into contact with the carbonaceous material and is highly heated, and the oxid of iron is deoxidized and carburized without practically any outside atmosphere coming in contact with it, and this is one of the main points desired, as if the atmosphere was allowed free access to the furnace it would counteract the deoxidizing and carburizing process to a harmful extent at a time when it is least desired, and for that reason the deoxidizing and carburizing of metal in the first instance is done by use of the heat from the inner walls of the furnace and that arising from the burning carbonaceous material solely. When the iron is thus uniformly and sufficiently deoxidized and carburized, the burner 13 is again set in operation, the damper 9 properly adjusted to allow the products of combustion to escape, and a suitable air-supply is furnished to the burner sufficient to supply to the interior of the furnace enough air to oxidize and decarburize the metal—*i. e.*, to burn out the excess of carbon—to the point necessary to produce wrought-iron sponge and heat sufficient to cause the particles of the iron to form into globules and ball-like masses, when it is ready to be taken from the furnace.

The process therefore consists of the following successive steps—viz., first, heating the inner walls of the rotary furnace to a suitable temperature; second, when the walls are suitably heated stopping the source of heat and introducing into the heated furnace a mixture of oxid of iron and carbonaceous material sufficient to deoxidize and carburize the iron; third, suitably closing the furnace, shutting out practically all atmospheric air and rotating the furnace until the iron is uniformly deoxidized and carburized practically without the presence of outside atmosphere; fourth, then by turning on the flame and atmosphere again to oxidize and decarburize the iron to the desired point and forming the iron into globules or ball-like masses, thus producing wrought-iron sponge or that practically.

The reason for performing the second step is that when the inner walls of the furnace are suitably heated, the mixture introduced, and the furnace suitably closed the emanations from the heated walls are devoid of an excess of oxygen, and the carbonaceous material not being acted upon by such oxygen or the outside atmosphere takes up what oxygen is in the metal and appropriates it to itself, and as it can get no other oxygen, as the furnace is closed, the carbon thoroughly withdraws all the oxygen contained in the iron, and thus thoroughly deoxidizes the iron, and at the same time the iron seizes upon the carbon in the carbonaceous material, thus carburizing itself fully and uniformly.

The furnace shown in the drawing is described as follows:

The numeral 1 shows a wrought-iron shell, and 12 the inner brick lining.

2 shows a gear meshing with the small gear 3, which is in operative connection with the worm-wheel 4 and the worm 5.

6 shows cast rings encircling the shell 1 and rolling on the wheels 7.

By operating the worm 5 a rotary motion is given the shell 1.

9 shows a movable damper to partly close the exit-opening leading to the stack 11, and 10 shows the downdraft-box.

13 shows the burner, by which coal is fed to the furnace.

The arrows show the direction of the flame from the burner as it passes through the furnace.

When the flame is stopped during the deoxidizing and carburizing process, the opening through which the burner enters the furnace is suitably closed.

Having described my invention, so that those skilled in the art may know how to make and use the same, what I claim, and desire to secure by Letters Patent, is—

The process of producing wrought-iron sponge consisting of mixing granulated oxid of iron with carbonaceous material sufficient to deoxidize and carburize the iron when the mixture is heated to a suitable temperature; heating the inner walls of a suitable movable furnace to such a temperature that the heat emanating therefrom will be sufficient to deoxidize and carburize the iron in the mixture; introducing the mixture into the furnace, closing the latter, agitating the mixture while subjected to the action of heat emanating from the walls of the furnace until the metal is suitably deoxidized and carburized; subjecting the deoxidized and carburized metal to the action of heat and atmospheric air sufficient to decarburize the metal and produce wrought-iron sponge substantially as described.

In testimony whereof I affix my signature in presence of two witnesses.

DEXTER REYNOLDS.

Witnesses:
MARCUS T. REYNOLDS,
L. VAN RENSSELAER.